United States Patent [19]

Horsch

[11] Patent Number: 5,601,160
[45] Date of Patent: Feb. 11, 1997

[54] HYDRAULICALLY ACTUATED BRAKE ASSEMBLY FOR AN OFF-HIGHWAY IMPLEMENT

[75] Inventor: Joachim Horsch, Lombard, Ill.

[73] Assignee: Case Corporation, Racine, Wis.

[21] Appl. No.: 326,546

[22] Filed: Oct. 20, 1994

[51] Int. Cl.⁶ ........................................... B60T 8/32
[52] U.S. Cl. ...................... 188/71.5; 188/170; 192/111 A
[58] Field of Search ................... 188/71.5, 71.8, 188/72.3, 196 R, 170; 192/18 A, 91 A, 91 R, 111 A

[56] References Cited

U.S. PATENT DOCUMENTS

| | | | |
|---|---|---|---|
| 3,770,085 | 1/1972 | Cottingham | 192/18 A |
| 3,974,896 | 8/1976 | Rach | 188/170 |
| 4,358,000 | 11/1982 | Cumming | 188/170 |
| 4,433,758 | 2/1984 | Crossman | 188/196 R |
| 4,560,034 | 12/1985 | Windish et al. | 188/170 |
| 4,657,127 | 4/1987 | Boffelli | 192/91 A |
| 5,253,737 | 10/1993 | Klaue | 188/170 |

Primary Examiner—Robert J. Oberleitner
Assistant Examiner—Chris Schwartz
Attorney, Agent, or Firm—John W. Harbst

[57] ABSTRACT

A hydraulically actuated brake assembly capable of rendering both a service brake function and a park brake function to a rotatable shaft that passes through a stationary housing. The brake assembly includes a series of wetted rotatable and nonrotatable brake members arranged in a stacked and intermixed relation within the housing and arranged coaxially about the shaft. The brake assembly further includes a service brake piston and a park brake piston for individually or conjointly applying a compressive force against the brake members thereby providing a braking action to the shaft and a park brake piston. The pistons are preferably arranged in axial alignment with each other and coaxially about the shaft. The service brake piston responds to fluid pressure being introduced into a first fluid receiving cavity. The park brake piston is spring applied and is responsive to the fluid pressure introduced into a second fluid receiving cavity. The brake assembly further includes a brake release mechanism for normally urging the service brake piston into a released position wherein the piston is disposed a fixed distance from the brake members. The brake release mechanism is specifically structured and designed to maintain a fixed clearance between the brake piston and the brake members when the brake piston is in its released position and self-compensates for wear on the braking surfaces of the brake members.

25 Claims, 5 Drawing Sheets

HYDRAULICALLY ACTUATED BRAKE ASSEMBLY FOR AN OFF-HIGHWAY IMPLEMENT

FIELD OF THE INVENTION

The present invention generally relates to brakes for off-highway implements such as cotton harvesters and agricultural combines and, more particularly, to a hydraulically actuated brake assembly that serves both a service brake function and a park brake function.

BACKGROUND OF THE INVENTION

The prior art discloses multiple disc wet brakes that are actuated by an annular hydraulic piston for normal service braking of an output shaft on a transmission of an off-highway implement. In such devices, hydraulic pressure is applied to the piston thereby forcing rotating brake discs that turn with the transmission output shaft into braking engagement with stationary brake discs thereby applying a braking action to the shaft. The prior art also discloses hydraulic type brakes that employ springs for forcing the brake discs or members into engagement relative to each other.

U.S. Pat. No. 3,974,896 to D. T. Rach discloses a brake assembly having a hydraulically actuated service brake and an independently spring applied park brake. The Rach brake design provides for emergency braking in case of hydraulic failure in the service brake. The Rach design further discloses springs for relieving pressure on the brake when no hydraulic pressure is available to apply to the service brake. As in most hydraulic brake designs, the brake piston in the Rach brake assembly is moved between a released position, wherein the brake piston applies no pressure to the annular brake discs, and an engaged position, wherein the piston applies a compressive force to the annular brake discs thereby applying a braking action to the output shaft of the transmission. During operation of the brake, an increment of wear will take place on the brake surfaces provided on opposite sides of each annular brake disc. As a result of the wear on the discs, there is an increase in the distance the brake piston travels between released and engaged positions.

To optimize the brake drag between the annular discs and to provide a substantially constant brake actuation response, it is important that the distance the brake piston travels between released and engaged positions be accurately controlled. As will be appreciated, the larger the clearance between the released position of the brake piston and the annular brake discs, the lower will be the brake drag developed between the annular brake discs and a longer response time will be required to brake the transmission output shaft. On the other hand, a shorter response time to actuate the brake can be effected by providing a smaller clearance between the released position of the brake piston and the annular brake discs. This reduced amount of clearance between the released position of the brake piston and the annular brake discs, however, will increase the brake drag thereby requiting more energy to operate the agricultural implement.

As will be appreciated, the brake drag between the annular brake discs should be maintained as low as possible when the brake piston is in a released position and the response to actuate the brake should be as fast as possible. A compromise between the degree of brake drag and the response time of the brake assembly is established when the brake assembly is designed and initially assembled. Inherent wear of the friction surfaces on the brake discs, however, changes the performance of the brake assembly over time and can lead to serious problems due to unpredictability of the brake assembly during operation of the agricultural implement.

Thus, there is a need and a desire for a wet disc brake assembly including a brake release mechanism that is self compensating to correct for the wear between the brake discs thus yielding substantially constant the brake operation during the useful life of brake assembly.

SUMMARY OF THE INVENTION

In view of the above, and in accordance with the present invention, there is provided a hydraulically actuated brake assembly including a series of annular friction brake members or plates coaxially mounted in a housing about a shaft and that are operative to impart a braking action to the shaft in response to operation of an actuator assembly. Each annular brake member has wetted brake surfaces on opposite sides thereof. The actuator assembly includes a first annular brake piston that moves as a function of fluid pressure in a first fluid receiving cavity. The first piston is movable through a path of travel along the axis of the shaft between a released position, wherein a fixed clearance is provided between the first piston and the brake members, and an engaged position, wherein the first piston applies a force against the brake members to impart a braking action to the shaft. In one form of the invention, the actuator assembly further includes a spring applied second annular brake piston that moves as a function of the fluid pressure in a second fluid receiving cavity. This second brake piston allows a parking or emergency brake function to be effected by the brake assembly.

In case the first brake should fail, the second brake piston is mounted in axial alignment with and for axial movement toward the first piston for yieldingly moving the first piston to apply a force against the brake members. That is, when the fluid pressure in the second cavity is less than the pressure applied to the second brake piston by a series of springs, the second piston moves the first piston into engagement with the brake members thereby applying a braking action to the shaft. On the other hand, when the fluid pressure in the second cavity is greater than the force applied to the second piston by the springs, the second piston is moved away from the first piston to relieve the braking force applied to the brake members and thereby the shaft. Notably, the first brake piston is movable toward and away from the friction brake members independently of the second piston and in response an increase in fluid pressure in the first fluid receiving cavity.

The present invention further includes a brake release mechanism for normally urging the first piston into a released position. A salient feature of the present invention being that the release mechanism is self compensating to maintain a fixed clearance between the first piston and the brake members thereby compensating for incremental wear on the braking surfacing of the plates.

The brake release mechanism is preferably comprised of a plurality of brake release assemblies which act in combination with each other to forcibly return the first brake piston to a released position when the fluid pressure in the fluid cavity is relieved such that the brake assembly no longer applies a braking action to the shaft. Each brake release assembly includes a mounting member that extends axially from one of the pistons of the actuator assembly. A spring mechanism is arranged about the mounting member for yieldingly moving the first piston towards its released position. A spring retainer assembly captively maintains the spring mechanism between opposite ends thereof and in operative association with a respective mounting member while permitting compression of the spring mechanism in response to axial movement of the first piston toward an engaged position. In response to an increase in the travel of the brake piston, the spring retainer assembly is axially movable along the length of the mounting member to compensate for wear of the friction brake surfaces of the brake members while maintaining the fixed clearance between the first piston and the brake members following the return of the first piston to its released position. It is important to note that the fixed clearance between the first piston and the brake members is controlled regardless of piston drag and the hydraulic back pressure in the fluid receiving cavity associated with the first piston since the spring retainer assembly captively maintains the spring mechanism between opposite ends thereof.

In one form of the invention, each spring retainer assembly comprises at least one ring that is clamped to a respective mounting member on opposite sides of the spring mechanism. Each ring is clamped to the mounting member with a pressure that prevents the ring from axially moving relative to the respective mounting member in response to compression of the spring mechanism while allowing both rings to axially move corresponding axial distances along the length of the respective mounting member in response to an increase in axial travel of the first piston. The ability to axially move the spring retainer assembly along the length of the respective mounting member compensates for wear on the brake surfaces of the friction brake members and serves to return the brake piston to a released position wherein the piston is consistently disposed at substantially the same distance from the brake members thus compensating for wear between the brake surfaces of the brake members.

In this first embodiment, the spring mechanism of each brake release assembly includes a stack of Belleville springs. As the first piston moves toward its engaged position with the brake members, a first portion of the piston engages and compresses the Belleville springs. After the springs are fully compressed, and in response to an increase in piston travel to compensate for wear of the brake surfaces between the brake members, the rings clamped to the mounting member are moved by the brake piston corresponding axial distances along the length of the respective mounting member. When the fluid pressure acting to axially move the first brake piston into braking engagement with the brake members is relieved, the spring mechanism will urge the first brake piston toward its released position and the adjusted position of the spring retainer assembly maintains the fixed clearance between the first brake piston and the brake members after the first brake piston is returned to its released position.

In an alternative form of the invention, each spring retainer assembly includes a cartridge that is slidable along the length of the mounting member in response to axial displacement of the first piston. The cartridge engages the spring mechanism at one end thereof and is provided with a sleeve captively arranged within the cartridge at an opposite end thereof. The sleeve is slidable along the length of the mounting member and relative to the cartridge and defines a first end that is captively maintained in the cartridge and that engages an opposite end of the spring mechanism. A second end of the sleeve extends axially beyond the cartridge a predetermined distance and engages at least one ring that is clamped to the mounting member.

When the first piston moves from its released position toward with the brake discs, the spring mechanism in the cartridge is increasingly compressed. After the piston travels a sufficient distance to compress the brake discs relative to each other and thereby apply a braking force to the shaft, the cartridge is arranged adjacent to the ring. Following an increment of wear between the braking surfaces of the discs, the ring is engaged by the cartridge and moved along the length of the mounting member under the influence of the first piston to adjust for wear on the brake surfaces of the friction brake members thereby maintaining the same travel for the first piston between engaged and released positions.

In another alternative embodiment of brake release assembly, the spring mechanism cooperates with the stationary brake assembly housing to impart a self-compensating return movement to the first brake piston. In this embodiment, the spring mechanism comprises a stack of Belleville springs. The spring retainer assembly in this embodiment comprises at least one annular ring arranged on opposite sides of the Belleville springs in clamped engagement with the mounting member that is secured to the first piston.

As the first piston moves from its released position toward engagement with the brake discs, the spring mechanism engages the brake assembly housing and is compressed in response to the axial movement of the piston. As the increment of wear between the brake surfaces on the discs increases, the innermost ring engages with the housing resulting in axial shifting movement of the spring mechanism and rings along the length of the mounting member thereby maintaining a fixed clearance between the brake piston and the brake members following return of the brake piston to its released position.

In the illustrated embodiment, the brake discs, and the first and second pistons all have different diameters. The piston closest to the brake members preferably has the largest diameter while the brake discs or members are larger in diameter than either piston. As such, the housing is provided with an internally stepped configuration. As will be appreciated, the internally stepped configuration of the housing lends itself to a relatively simple casting process in that no pockets are created which would require coring.

The housing is further provided with internal reaction slots that coact with radial tangs that extend from those brake members that are held stationary relative to the housing. The reaction slots are preferably configured in the housing so as to eliminate the need for coring of the housing. Moreover, the brake assembly of the present invention includes wear pins that are fitted between the tangs and the stationary brake rings in the housing to reduce the wear on the reaction slots defined by the housing.

In a preferred form of the invention, the first piston is provided with inner and outer annular seals that are arranged in fluid tight sliding relation relative to the first fluid receiving cavity. Moreover, the housing preferably defines a series of passages arranged in association with the first fluid cavity for interrupting the sealing action of the inner seal in the housing after the first piston travels beyond a predetermined distance. Interrupting the sealing action between the piston and the housing causes a deterioration in the brake function affected by the first piston while maintaining the braking function effected by the second piston.

With the present invention, a service brake function or a park brake function can be affected by the brake assembly depending upon the fluid pressure in the fluid receiving cavities. An independent spring applied and pressure released arrangement is provided in combination with the brake piston used to apply the park brake. Such arrangement is also used for emergency braking in case of a hydraulic failure in the service brake system. Notably, the brake release mechanism is configured to respond only to actuation of the service brake and not to the park brake function.

An advantage of the present invention is that the brake piston used to impart a compressive force on the brake members is returned to its released position under the influence of a brake release mechanism that maintains a constant or fixed clearance between the brake piston and the brake members when the brake piston is in a released position regardless of the increment of wear on to the brake surfaces of the brake members. Accordingly, the present invention provides an adjustment free brake system. Moreover, the brake assembly of the present invention is reliable in the sense that it will not freeze up or rust after long periods of non-use. Because the brake assembly of the present invention is self-compensating, it will provide an extended period of operation for the brake members. Moreover, the present invention is relatively simple in operation and economical to manufacture. Because the brake assembly of the present invention is self-compensating, it maintains the initial setting for clearance between the brake piston and the brake members to optimize the amount of brake drag while providing a continuously constant actuation response.

These and other numerous other objects, aims and advantages of the present invention will become readily apparent from the following detailed description, the drawings, and the appended claims.

DETAILED DESCRIPTION OF THE PRESENT INVENTION

While the present invention is susceptible of embodiment in various forms, there is shown in the drawings and will hereinafter be described a preferred embodiments of the invention with the understanding that the present disclosure is to be considered as setting forth exemplifications of the invention which are not intended to limit the invention to the specific embodiment illustrated.

Figure 1:
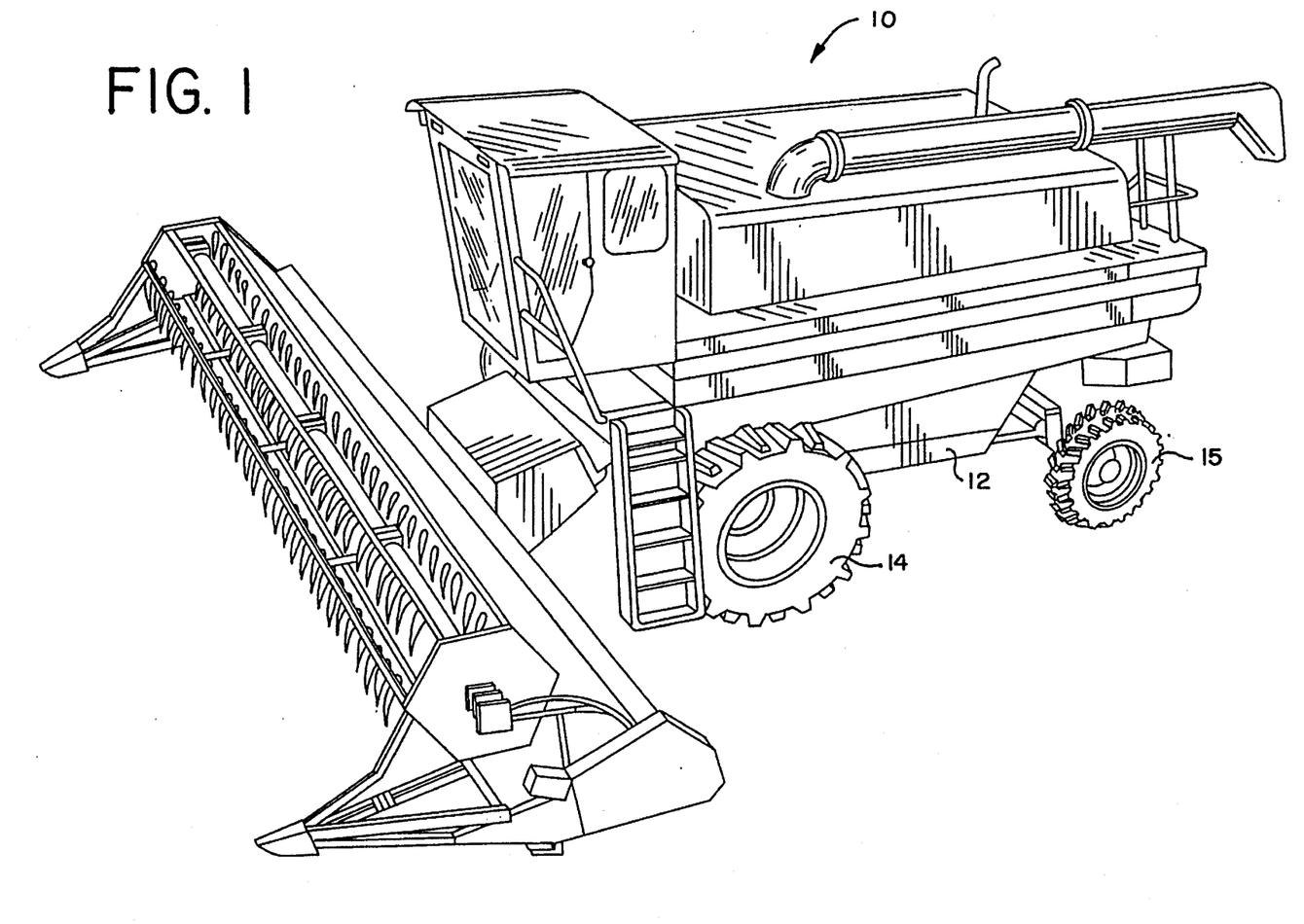
FIG. 1 is a perspective view of an agricultural combine with which the present invention finds utility.

Referring now to the drawings, wherein like reference numerals indicate like parts throughout the several views, there is shown FIG. 1 an off-highway implement such as an agricultural combine that is generally referenced by numeral 10. The combine 10 includes a mobile frame 12 mounted for movement across a field by a pair of primary drive wheels 14 arranged toward a front of the combine and a pair of smaller or steering wheels 15 arranged toward a rear of the combine.

Each drive wheel 14 on the implement 10 receives power from a power train assembly including a conventional self propelled engine (not shown) and transmission 16 (FIG. 2) including a housing 17 mounted on the frame 12 (FIG. 1) of the combine. The transmission 16 has drive shafts 18 extending in opposite directions therefrom for independently turning each drive wheel 14.

According to the present invention, a hydraulically actuated brake assembly 20 is operatively associated with each drive shaft 18 (FIG. 2) extending from the transmission 16. In a preferred form of the invention, each brake assembly 20 provides both a service brake function and a park brake function to the respective drive wheel 14 and preferably includes a stationary housing 22 that surrounds the transmission output shaft 18 associated therewith. As shown, the output shaft 18 turns or rotates about a fixed axis 26. Since the brake assembly 20 associated with each drive wheel 14 of the implement is substantially similar, only one brake assembly will be discussed in detail with the understanding that the other brake assembly is substantially similar in construction thereto. Each brake assembly 20 further includes a plurality of annular friction brake members 28 and 30 that are arranged coaxially about the shaft 18 in an intermixed and stacked relationship relative to each other and that function in response to an actuator assembly 32.

Figures 2, 3, 7:
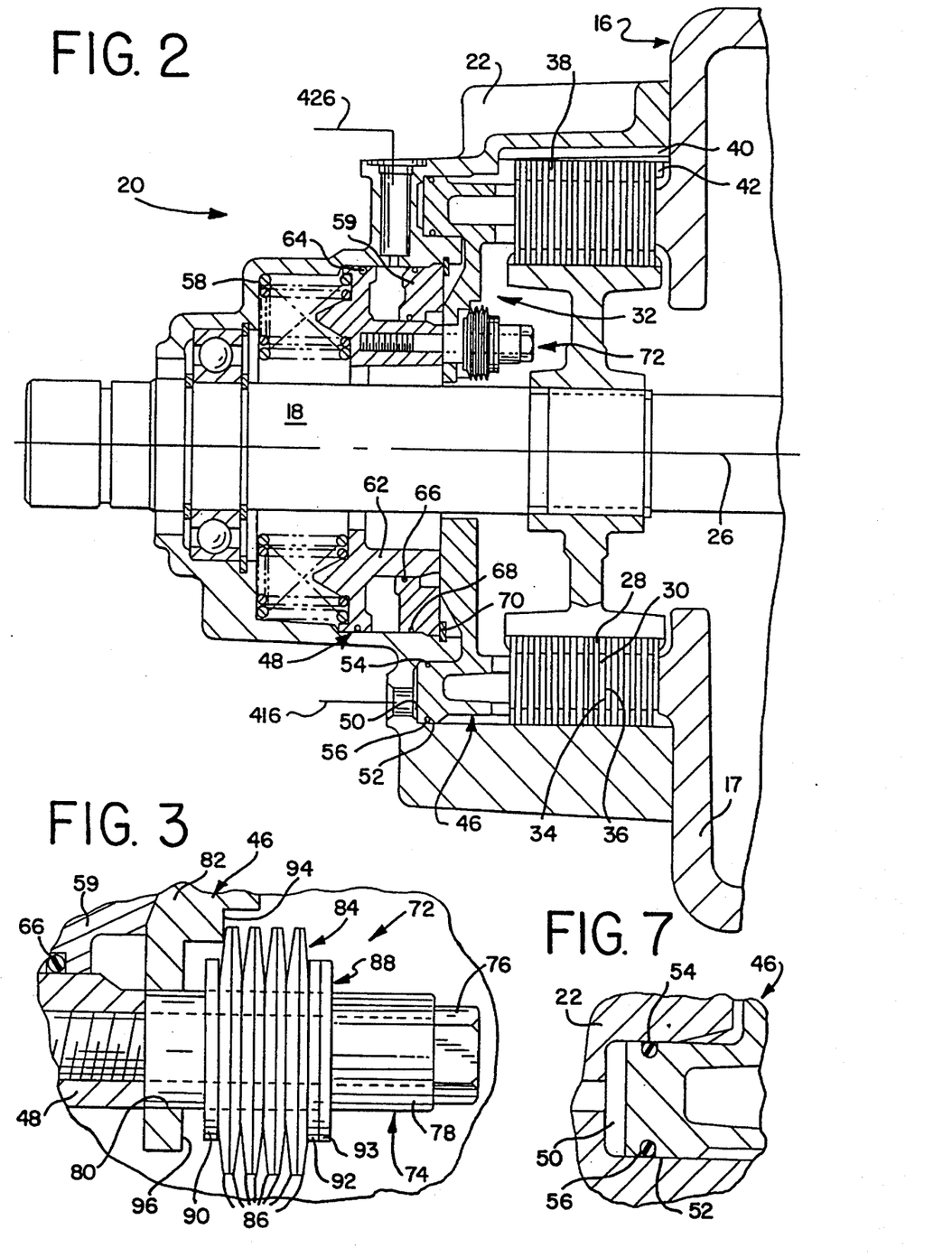
FIG. 2 is a longitudinal sectional view of a first embodiment of a hydraulically actuated brake assembly according to the present invention.
FIG. 3 is an enlarged elevational view of that embodiment of a self compensating brake release mechanism forming part of the brake assembly shown in FIG. 2.
FIG. 7 is an enlarged sectional view illustrating a preferred relationship between a brake piston and a housing of the brake assembly.

Each friction brake member 28, 30 has an annular plate-like configuration. As shown, the friction brake members 28 are splined to and rotate with the transmission output shaft 18 while the alternating brake members 30 are prevented from rotating and remain stationary with the housing 22. Notably, each friction brake member has wetted friction brake surfaces 34 and 36 on opposite sides thereof.

In the illustrated form of the invention, each stationary friction brake 30 includes radially extending tangs 38 about the periphery thereof. The tangs 38 on friction brakes 30 are adapted to engage with reaction slots 40 provided on the peripheral interior of housing 22. Preferably, wear pins 42 are fitted between the tangs 38 and the reaction slots 40 to reduce the wear on the reaction slots defined by the housing. The use of wear pins 42 promotes the use of a relatively soft material, i.e., aluminum for the stationary housing 22. As will be appreciated aluminum has good heat transfer characteristics and can be economically die cast.

Suffice it to say, the frictional brake members 28 and 30 are stacked in a conventional and well-known arrangement such that application of an axial force on the brake members 28 and 30 will bring the friction brake surfaces 34, 36 on confronting brake discs 28 and 30 into face-to-face contact with each other. Accordingly, the stationary brake members 30 will inhibit the brake members 28 from turning and, consequently, impart a braking force to the shaft 18. In a most preferred form of the invention, the transmission housing 17 serves as a reaction surface for the friction brake members 28 and 30.

As shown, the actuator assembly 32 comprises a pair of axially aligned brake pistons 46 and 48. Both pistons 46, 48 preferably have an annular configuration and are coaxially arranged about and axially displacable along the axis 26 of shaft 18 in housing 22. In the illustrated embodiment, brake piston 46 is adapted to apply a compressive axial force to the friction brake members 28 and 30 either independently of or in combination with brake piston 48. As shown, piston 46 has a larger annular diameter than does brake piston 48 but has a smaller diameter than that of discs 28, 30. Accordingly the interior of housing 22 has a peripherally stepped internal configuration. The arrangement of the brake members 28, 30 and pistons 46 and 48 is such that the interior of housing 22 has continuously smaller diameters from right to left thereby lending itself to a relatively simple casting process in that no pockets are created which would require coating of the housing 22.

In the illustrated embodiment, piston 46 acts as a service brake piston that is movable between a released position (as shown in FIG. 2) and an engaged position. Notably, when the service brake piston 46 is in a released position, a fixed clearance is provided between the service brake piston 46 and the brake members 28 and 30. As shown, a portion of brake piston 46 combines with the housing 22 to define a first fluid receiving annular cavity or piston bore 50.

In a most preferred form of the invention, the brake piston 46 is provided with a cylindrical extension 52 that axially moves within the piston bore 50 and is provided with inner and outer annular seals 54 and 56, respectively, arranged in fluid tight sliding relation with the fluid receiving bore 50. By this arrangement, pressurized hydraulic fluid introduced to the cavity 50 acts to axially displace piston 46 to the right, as shown in FIG. 2. Such axial movement, causes the piston 46 to move into an engaged position thus causing the brake surfaces 34, 36 on the brake members 28 and 30 to impart a braking action to the shaft 18. As will be appreciated, varying the amount of fluid pressure in cavity 50 controls the amount of frictional force between the rotating discs 28 and the stationary plates 30 since the braking force between discs 28, 30 is proportional to the pressure in cavity 50.

In the illustrated embodiment, piston 48 acts as a park brake piston that is resiliently biased toward an engaging position with piston 46 by a plurality of equally spaced springs 58. Piston 48 also acts an emergency brake in case of hydraulic failure in the service brake system of the present invention. As shown, piston 48 combines with an annular ring 59 and housing 22 to define a second fluid receiving cavity 60. The torque capacity of the park brake 48 is proportional to the force applied by springs 58 minus the fluid pressure within cavity 60. Thus, a controlled braking action can be achieved on shaft 18 by brake piston 48 and by varying the fluid pressure in the cavity 60.

As shown, piston 48 is provided with a diametrical extension 62 that extends axially toward piston 46. In the illustrated embodiment, a portion of piston 46 extends radially closer to the axis 26 of shaft 18 than does the diametrical extension 62 such that, upon axial displacement of piston 48, the cylindrical extension 62 engages with and is capable of axially moving the piston 46 toward the brake members 28 and 30.

Piston 48 includes an annular seal 64 that is arranged in fluid tight sliding relation relative to the interior of housing 22. Moreover, the annular ring 59 is provided with inner and outer annual seals 66 and 68, respectively. The inner seal 66 is arranged in fluid tight sliding relation with the extension 62 on piston 48. The outer seal 68 is arranged in a fluid tight relation relative to the interior of housing 22. Also, the annular ring 59 is prevented from axially moving into engagement with piston 46 through a limit stop preferably in the form of a wire ring 70 that is engaged between the housing 22 and the outer circumference of the ring 59.

In the illustrated embodiment, the introduction of pressurized fluid into the fluid receiving cavity 60 will cause the piston 48 to move to the left, as shown in FIG. 2, against the action of the springs 58. As will be appreciated, stop 70 limits axial movement of ring 59 toward piston 46. When the fluid pressure in the fluid receiving cavity 60 is reduced, the springs 58 act to yieldingly move the diametrical extension 62 on brake piston 48 into engagement with brake piston 46 thereby imparting a compressive force to the friction members 28, 30 and thereby imparting a braking action to the shaft 18.

From the above, it will be appreciated that the service piston 46 is movable from a released position to apply a force against the brake members 28, 30 either independently of the action of the brake piston 48 or as a result of the application of the park brake piston 48 thereby imparting a braking force to the shaft 18. Moreover, it should be appreciated that the particular design of the brake pistons 46 and 48 can be modified or altered from that shown as described above without detracting or departing from the spirit in scope of the present invention.

A salient feature of the present invention concerns the provision of a brake release mechanism for normally urging the service brake piston 46 to a released position when only reduced fluid pressure is provided to the receiving cavity 50 and when the brake piston 48 is ineffective to yieldingly urge piston 46 to apply brake force to the brake members 28, 30. In addition to serving to return the piston 46 to a released position, the brake release mechanism of the present invention compensates for wear between the brake surfaces 34 and 36 on the brake members 28, 30. Accordingly, the present invention allows for a constant distance to be preset between the piston 46 and the brake members 28, 30 regardless of the wear between the friction brake surfaces 34 and 36 on the brake members 28, 30.

The brake release mechanism of the present invention includes a plurality of individual brake release assemblies 72 arranged in equally spaced relation about the piston 46. In the most preferred form of the invention, four individual and substantially identical brake release assemblies 72 are provided in operative association with the piston 46. In the illustrated form of the invention, the self-compensating brake release assemblies 72 are peripherally disposed about the actuator assembly 32 for normally urging the piston 46 into a released position, wherein a fixed clearance is provided between the piston 46 and the brake members 28, 30 (FIG. 2). It should be appreciated, however, that less or more brake assemblies could be provided in operative association with the brake piston 46 without detracting or departing from the spirit and the scope of the present invention. Also, since each brake assembly 72 is substantially identical, only one brake assembly will be discussed in detail with the understanding that the other brake assemblies, arranged in operative association with the actuator assembly 32, are substantially similar thereto.

In a first embodiment, and is shown in FIG. 3, each brake release assembly 72 includes an axially elongated mounting member 74 that extends generally parallel to shaft 18 (FIG. 2). As shown, the mounting member 74 includes an elongated bolt 76 that is connected to and extends from piston 48. Notably, an axially elongated and shouldered or sleeved portion 78 of bolt 76 passes in close radial relation and axially through an aperture or hole 80 defined in a wall or web 82 of piston 46 extending radially relative to shaft 18.

A spring mechanism 84 is arranged coaxially about and extends radially from a respective mounting member 74 for resiliently urging brake piston 46 away from the brake members 28, 30 (FIG. 2) and toward its released position. In the first embodiment of the release assembly 72, the spring mechanism 84 comprises a series or pack of axially aligned Belleville springs 86 that extend outwardly from the shouldered or sleeved portion 78 of bolt 76.

Each release assembly 72 further includes a spring retainer assembly 88 for captively maintaining the spring mechanism 84 between opposite ends thereof and in operative association with a respective mounting member 74 while permitting compression of the spring mechanism 84 in response to axial movement of the brake piston 46 away from its released position and toward the brake members 28, 30. In the first illustrated form of the release assembly 72, the spring retainer assembly 88 comprises axially spaced annular snap rings 90 and 92 that are resiliently clamped to the shouldered or sleeved portion 78 of mounting members 74 on opposite sides of the spring mechanism 84. Each ring 90, 92 is resiliently clamped to the mounting member 74 with a pressure that prevents each ring 90, 92 from axially moving relative to the respective mounting member 74 in response to compression of the spring mechanism 84. A third annular snap ring 93 can be added to the spring retainer assembly 88 to prevent the spring mechanism 84 from axially shifting along the length of the mounting member 74 in response to movement of the brake piston 46. The third ring 94 is clamped to the mounting member 74 in adjacent relation relative to ring 92.

In response to pressurized fluid being introduced to the cavity 50 (FIG. 2), the piston 46 will move from its released position rightwardly, as shown in FIGS. 2 and 3, and the spring mechanism 84 is compressed. In the illustrated form of brake release assembly, the left side of the spring pack 84 is contacted by a first portion 94 of the piston 46 which, as the piston 46 moves rightwardly, as seen in FIGS. 2 and 3, passes over the snap ring 90. The first portion 94 of piston 46 preferably contacts the spring mechanism 84 near the outer diameter of the Belleville springs 86 and the fight side of the spring pack 84 is contacted and held against axial displacement by the snap ring 92 clamped onto the mounting member 74. Since the mounting member 74 is secured to the piston 48 in this first embodiment, the mounting member 74 does not move with the piston 46 and, accordingly, the spring mechanism 84 is increasingly compressed as the piston 46 moves from its released position. When the fluid pressure in cavity 50 is reduced to remove the braking action on shaft 18, the brake release mechanism 72 will return the piston 46 leftwardly, as shown in FIGS. 2 and 3, until the left side of the spring mechanism 84 again contacts the snap ring 90.

Figure 4:
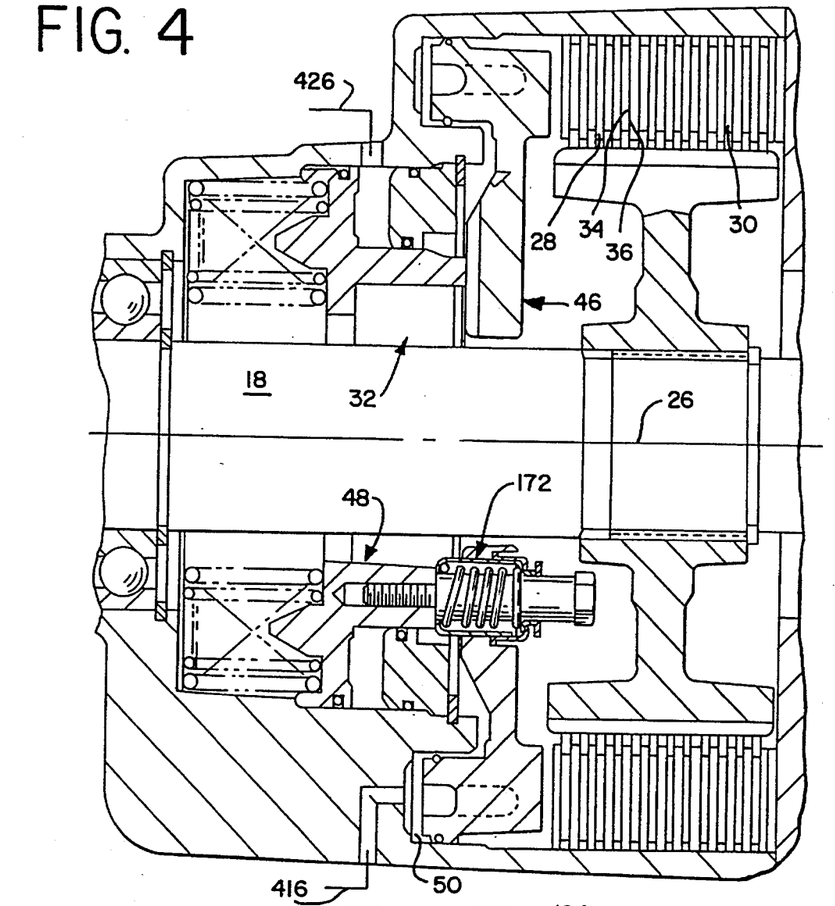
FIG. 4 is a longitudinal sectional view of a second embodiment of a hydraulically actuated brake assembly according to the present invention.
Figure 5:
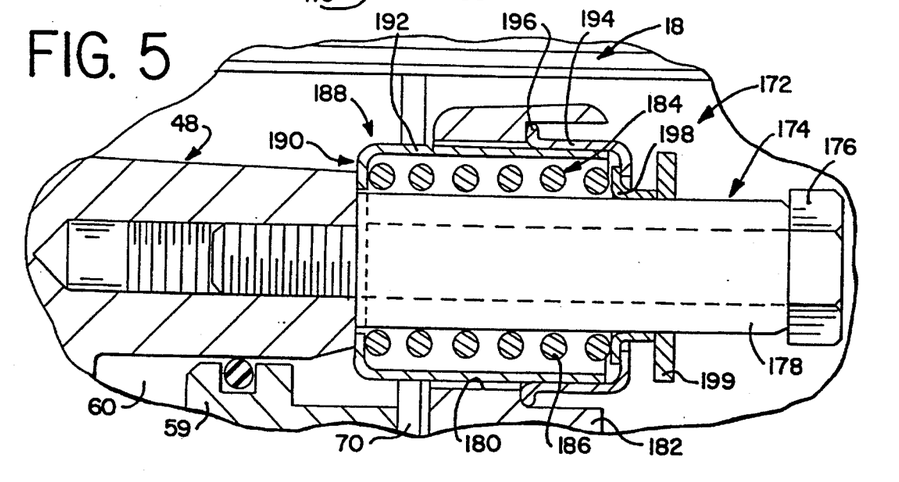
FIG. 5 is an enlarged longitudinal sectional view of the second embodiment of a self compensating brake release mechanism forming part of the brake assembly of the present invention.

FIG. 4 and 5 illustrate an alternative embodiment of a brake release assembly designated generally by reference numeral 172 and that is arranged in combination with the pistons 46 and 48 of the actuator assembly 32. As discussed above, the purpose of the release mechanism 172 is to yieldingly move the piston 46 to a released position when the fluid pressure in cavity 50 subsides. The elements of this alternative embodiment of brake release assembly that are identical or functionally analogous to those of the first embodiment of brake release assembly are designated by reference numerals identical to those used in the first embodiment with the exception that the second embodiment reference numerals are in the one-hundred series.

As shown in FIG. 5, the brake release assembly 172 includes an axially elongated mounting member 174 that extends generally parallel to shaft 18. In the illustrated embodiment, the mounting member 174 includes an elongated bolt 176 that extends from and is connected to piston 48. As shown, bolt 176 of mounting member 174 further includes an axially elongated shouldered or sleeved portion 178.

A spring mechanism 184 is arranged coaxially about the mounting member 174 for resiliently urging the brake piston 46 away from the brake members 28, 30 (FIG. 4) and towards it released position. In this second embodiment of the release mechanism 172, the spring mechanism 184 comprises a compression spring 186.

Each release mechanism 172 further includes a spring retainer assembly 188 for captively maintaining the spring mechanism 184 between opposite ends thereof and in operative association with the mounting member 174 while permitting compression of the spring mechanism 184 in response to axial movement of the brake piston 46 away from its released position and toward the brake members 28, 30 (FIG. 4). In the second illustrated form of brake release assembly 172, the spring retainer assembly 188 includes a cylindrical and axially elongated cartridge 190 that captively maintains the spring mechanism 184 between opposite ends thereof and in operative association with the mounting member 174 for permitting increased compression of the spring mechanism 184 in response to axial movement of the brake piston 146 from a released position.

In this second illustrated form of brake release assembly 172, the spring retainer assembly 188 is slidable along the length of the mounting member 174 in response to movement of the piston 46 from a released position. As shown, the spring retainer cartridge 190 is comprised of a pair of cup shaped members 192 and 194 that are fixedly joined in confronting relation relative to each other to captively maintain the spring 186 of mechanism 184 therebetween and through which the mounting member 174 coaxially extends.

In the illustrated embodiment, member 192 of cartridge 190 passes through a suitably configured aperture or hole 180 defined in a wall or web 182 of piston 46 that extends radially relative to shaft 18. Spring 186 contacts cartridge member 192 at the left side thereof, as shown in FIG. 5. As shown, member 194 of the spring retainer cartridge 190 includes an external radial flange 196 that extends away from the elongated axis of mounting member 174.

Cartridge 190 further includes a sleeve 198 that is captively maintained within the cartridge 190 and axially extends a fixed axial distance therefrom. Notably, the sleeve 198 is axially slidable relative to and within cartridge 190 between predetermined limits.

As shown, one end of sleeve 198 engages an opposite end of the spring 186 while the other end of sleeve 198 extends axially beyond the cartridge 190 and contacts at least one snap ting 199 that is resiliently clamped to the shouldered or sleeved portion 178 of mounting member 174. Ring 199 is resiliently clamped to the mounting member 174 with a pressure that prevents ring 199 from axially moving relative to mounting member 174 in response to compression of the spring mechanism 184. As explained above, additional rings (not shown) could be arranged adjacent to ring 199 without detracting or departing from the spirit and scope of the present invention.

In response to pressurized fluid being introduced to the cavity 50, piston 46 will move from its released position rightwardly, as shown in FIG. 5, and the spring mechanism 184 is compressed. That is, when brake piston 46 moves to the right, as shown in FIG. 5, piston 46 engages the flange 196 on cartridge 190 such that the cartridge members 192 and 194 move with the piston 46. In the second embodiment of the brake release assembly, the mounting member 174 is secured to the piston 48 and, therefore, does not move in response to actuation of piston 46. Accordingly, as cartridge 190 axially moves with the piston 46, cartridge member 194 axially slides over the sleeve 198 (which is prevented from axial movement by ting 199) and, thus, spring 186 is compressed within the cartridge 190. When the fluid pressure in cavity 50 is relieved, the compressed spring 186 will yieldingly urge the piston 46 leftwardly, as seen in FIG. 5, by the fixed distance that sleeve 198 axially extends beyond the cartridge 190.

Figure 6:
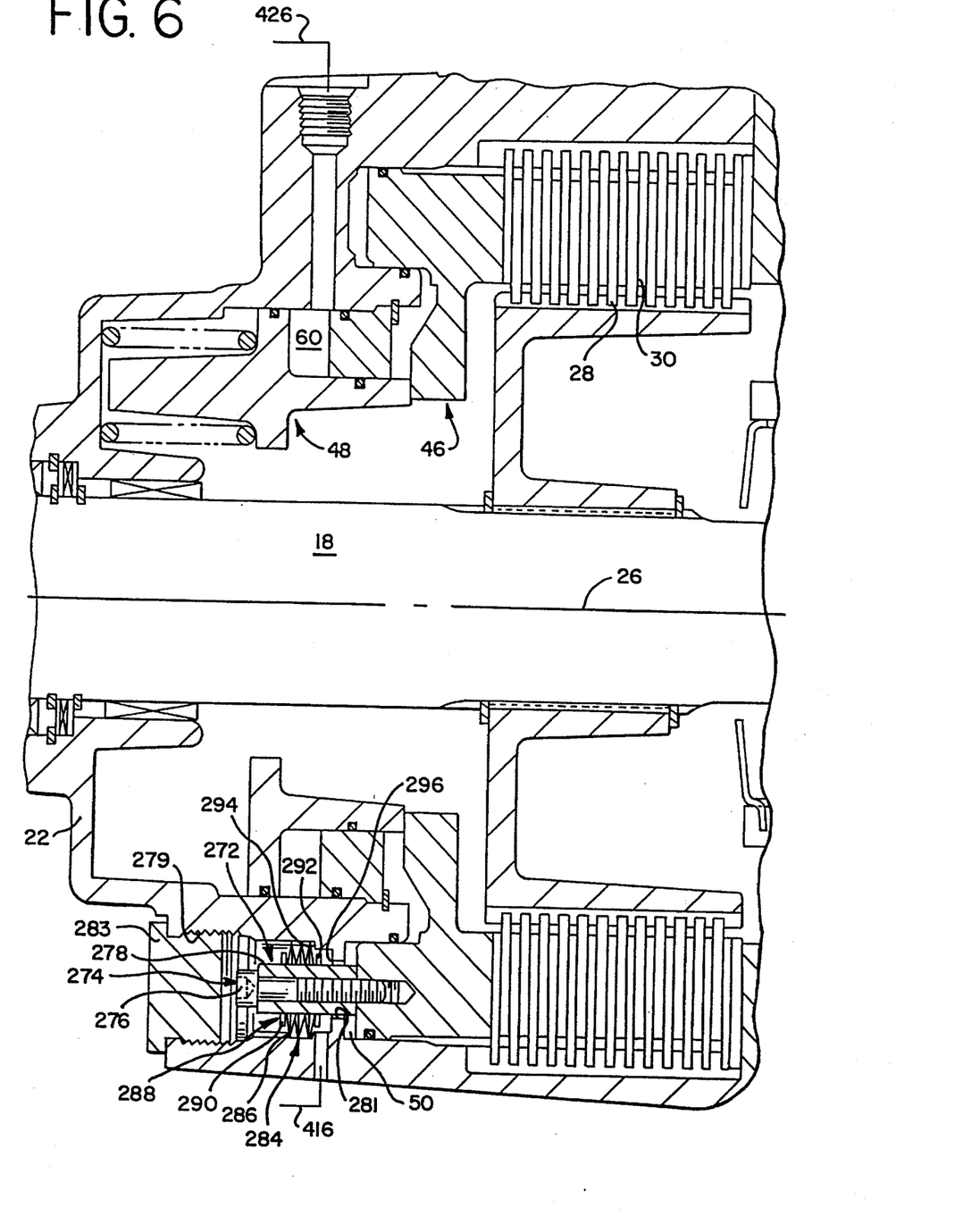
FIG. 6 is a longitudinal sectional view of a third embodiment of a brake assembly according to the present invention.

FIG. 6 illustrates still another embodiment of a brake release assembly, designated generally by reference numeral 272, that is arranged in combination with piston 46 and housing 22 for yieldingly moving the piston 46 to a released position when the fluid pressure in cavity 50 subsides. The elements of this alterative embodiment of brake release assembly that are identical or functionally analogous to those of the first embodiment are designated by reference numerals identical to those used in the first embodiment with the exception that the second embodiment reference numerals are in the two-hundred series.

This alternative embodiment of the brake release assembly 272 includes an axially elongated mounting member 274 that extends generally parallel to the axis 26 of shaft 18. As shown, the mounting member 274 includes an elongated bolt 276 that is connected to and axially extends rearwardly from piston 46. To permit the mounting member 274 to axially extend rearwardly from piston 46, housing 22 is configured with an internally stepped and closed cavity or bore 279 that is preferably axially aligned with the bolt 276. Besides having a stepped internal configuration, cavity 279 defines a through-hole or aperture 281. In the illustrated embodiment, the aperture 281 passes into the cavity or bore 50. A seal plug 283 is provided in cavity 279 to prevent pressurized fluid from inadvertently escaping from cavity 50. Notably, an axially elongated shouldered or sleeved portion 278 of bolt 276 passes in close relation and axially through the aperture 281 defined in housing 22.

A spring mechanism 284 is arranged coaxially about and extends radially from the mounting member 274 for resiliently urging the brake piston 46 away from the brake members 28, 30 and towards its released position. In this third embodiment of the release assembly 272, the spring mechanism 284 comprises a series or pack of axially aligned Belleville springs 286 that extend radially outward from the shouldered or sleeved portion 278 or bolt 276.

The brake release assembly 272 of this third embodiment further includes a spring retainer assembly 288 for captively maintaining the spring mechanism 284 between opposite ends thereof and in operative association with the mounting member 274 while permitting compression of the spring mechanism 284 in response to axial movement of the brake piston 46 away from its released position and toward the brake members 28, 30. In this third illustrated form of the release mechanism 272, the spring retainer assembly 288 includes annular snap rings 290 and 292 that are resiliently clamped to the shouldered or sleeved portion 278 of mounting member 274 on opposite sides of the spring mechanism 284. Each ring 290, 292 is resiliently clamped to the mounting member 274 with a pressure that prevents each ring 290, 292 from axially moving relative to the respective mounting member 274 in response to compression of the spring mechanism 284. In the same manner described above, the spring retainer assembly 288 may include one or more additional snap rings (not shown) mounted to and clamped on the mounting member 274 adjacent to ring 290 without detracting or departing from the spirit and scope of the present invention.

In response to pressurized fluid being introduced to the cavity 50, piston 46 will move from its released position rightwardly, as shown in FIG. 6, and the spring mechanism 284 is compressed. In the illustrated form of the brake release assembly shown in FIG. 6, and as piston moves from its released position, the right side of the spring pack 286 is contacted by a first or shouldered portion 294 defined within cavity 279. The first portion 294 of housing 22 is configured to pass over ring 292 and contact the spring mechanism 284 near the outer diameter of the Belleville springs 286. The left side of the spring mechanism 284 is contacted by the snap ring 290 clamped onto the mounting member 274. As piston 46 moves from its released position rightwardly, as shown in FIG. 6, the mounting member 274 moves therewith and accordingly the spring mechanism 284 is compressed. When the fluid pressure in cavity 50 is relieved to remove the braking action on shaft 18, the brake release mechanism 272 effects the return of piston 46 leftwardly, as shown in FIG. 6, until the right side of the spring mechanism 284 again contacts snap ring 290.

As shown in FIG. 7, housing 22 is provided with a series of passages 98 arranged in association with the piston bore 50 that houses the cylindrical extension 52 of brake 46. Preferably, four equally spaced slots 98 are provided along the radial innermost surface of the bore 50 toward that end that receives the cylindrical extension 52 of piston 46. The passages 98 serve to interrupt the effect of the seal 54 when piston 46 travels beyond a predetermined distance within the bore 50. Accordingly, the present invention is configured such that should the service brake system fail, the brake assembly will still provide emergency braking to the shaft 18.

In the arrangement illustrated in FIGS. 2 and 3, brake piston 46 will axially move from its released position and toward the brake discs 28, 30 in response to the introduction of pressurized fluid to cavity 50. As the brake piston 46 moves from its released position, the first portion 94 of piston 46 engages the outer diameter of spring mechanism 84 thereby compressing the Belleville springs 86 since the mounting member 74 is held stationary by piston 48. Notably, the spring mechanism 84 does not deflect during application of the park brake piston 48.

As is conventional, piston 46 has a predetermined travel between a fully released position and a fully engaged position wherein the brake surfaces 34, 36 on the brake discs 28, 30 are in full engagement with each other. In the illustrated embodiment, the predetermined travel of piston 46 measures about three millimeters (3 mm.) between fully released and fully engaged positions.

As shown in FIG. 3, the snap rings 90, 92 comprising the axially innermost rings of the spring retainer assembly 88 are axially spaced from each other the same predetermined travel distance of piston 46. That is, in the illustrated embodiment, the rings 90, 92 are axially spaced apart by a distance of approximately three millimeters. Accordingly, when piston 46 fully engages the brake members 28, 30 (FIG. 2), the Belleville springs 86 are fully compressed and generally flat. In such position, a second portion 96 of piston 46 engages the snap ring 90. As shown, the first and second portions 94 and 96 of piston 46 are axially separated from each other by the same distance as required for the predetermined travel of piston 46 to fully engage the brake discs 28, 30.

An increment of wear develops between the brake surfaces 34, 36 of the discs 28, 30 (FIG. 1) during operation of the brake assembly 20. The present invention compensates for wear between the friction brake services 34, 36 on brake members 28, 30 to maintain a fixed clearance between the brake piston 46 and the brake members 28, 30 after the brake piston 46 is returned to its released position to optimize the brake drag between the brake members 28, 30 while maintaining a substantially constant brake actuation response.

To effect such ends, the axial spacing between the first and second portions 94 and 96 of the brake piston 46 automatically adjusts the position of the rings of the spring retainer assembly 88 relative to the respective mounting member 74 of the brake release mechanism. As will be appreciated, an increment of wear between the brake surfaces 34, 36 requires the piston 46 to travel beyond the preset distance heretofore required to fully compress the brake members. As piston 46 travels beyond the initial preset distance, and because the Belleville springs 86 are fully compressed, the second portion 96 of the piston axially moves or shifts all the rings of the spring retainer assembly 88 along the length of the mounting member. Accordingly, when the fluid pressure in cavity 50 is relieved to release the brake, spring mechanism 84 will tend to return the piston to its released position and the adjusted position of the spring retainer assembly 88 along the length of the mounting member 74, will position the piston 46 such that a fixed clearance relative to the brake members 28, 30. Thus, the fixed clearance between the piston 46 and the brake members 28, 30 is controlled regardless of the effect of the seals 54 or 56 or hydraulic back pressure within cavity 50 since the rings 90 and 92 of the spring retainer assembly 88 are provided on opposite sides of the spring mechanism 84.

With the arrangement illustrated in FIGS. 4 and 5, the brake piston 46 will axially move from its released position and toward the brake disks 28, 30 upon introduction of pressurized fluid into cavity 50. In the illustrated embodiment, the predetermined travel of piston 46 is about three millimeters (3 mm.) between released and engaged positions. As the piston 46 moves rightwardly, as shown in FIGS. 4 and 5, the cartridge 190 will likewise move rightwardly therewith as a result of piston 46 engaging with the radial flange 196 on cartridge 190. The sleeve 198, however, of cartridge 190 will engage snap ring 199 and initially be prevented from axially moving relative to the mounting member 174. In response to rightward movement of the piston 46, the sleeve 198 will telescopically move within the cartridge 190 thereby causing the spring 186 of spring mechanism 184 to compress.

As discussed above, piston 46 has a predetermined travel between a fully released position and a fully engaged position. In the embodiment illustrated in FIG. 5, the ring 199 is axially spaced from the outermost radial edge of cartridge member 194 by the same distance required for the travel of piston 46 between its fully released and fully engaged positions. In the illustrated embodiment, the sleeve 198 axially extends about three millimeters (3 mm.) beyond the cartridge 190 when the brake piston 46 is in a released position.

As discussed above, an increment of wear between the brakes surfaces 34, 36 will require the brake piston 46 to have an increased travel from its released position to fully engage the brake members 28, 30. As the predetermined travel of piston 46 increases, the cartridge 190, which moves with piston 46, will engage with the snap ring 199, thus axially displacing or adjusting the position of ring 199 along the length of the respective mounting member 174 an amount corresponding to the increase in travel of the piston 46.

Upon release of the pressure in fluid cavity 50, the spring mechanism 184 will force the piston 46 leftward, as seen in FIG. 4 and 5, a fixed distance, which remains the same, regardless of brake disc wear. That is, upon the release of pressure in cavity 50, the spring 186 will forcibly move the cartridge 190 and thereby the piston 46 to its released position. At the same time, the sleeve 198 will be forcibly extended outwardly from the cartridge 190 into engagement with the adjusted position snap ring 199. Because the axial position of the ring 199 was adjusted to compensate for the increase in travel of the piston 46 due to the wear on the brake discs 28, 30, however, the piston 46 will be returned such that a fixed clearance is provided between the piston 46 and the brake members 28 and 30. Thus, when piston 46 is returned to its released position, a fixed clearance is provided between it and the brake disks 28, 30 regardless of the wear between the brake surfaces 34 and 36.

As compared to the embodiment of the invention illustrated in FIGS. 2 and 3, the embodiment of the invention illustrated in FIGS. 4 and 5 advantageously offers a substantial reduction (approximately 50%) in the force required to move the ring 199 axially along the length of the mounting member 174.

With the arrangement shown in FIG. 6, the brake piston 46 will axially move from its released position and toward the brake disks 28, 30 upon introduction of pressured fluid to cavity 50. In the illustrated embodiment, the predetermined travel of piston 46 measures about three millimeters (3 mm.) between fully released and fully engaged positions. As the piston 46 moves rightwardly, the mounting member 274 moves therewith and a first portion 294 of housing 22 engages the outer diameter of the spring mechanism 284 thereby compressing the Belleville springs 286 between the rings 290 and 292.

As discussed above, piston 46 moves through a predetermined travel between its fully retracted position and its fully engaged position. In the illustrated embodiment, the piston 46 travels an axial distance of about 3 millimeters between its fully released position and its fully engaged position. The axial spacing between the axially innermost rings of the spring retainer assembly 288 equals the predetermined travel of the piston 46. Accordingly, when piston 46 fully engages the brake members 28, 30, the Belleville springs 286 axe full compressed and are flat relative to each other. In such position, a second portion 296 of housing 22 engages the snap ring 292.

As discussed above, an increment of wear between the brake surfaces 34 and 36 will require the brake piston 46 to increase in travel between its released position and fully engaged position. As the travel of piston 46 increases, the snap ring 292 will engage the second portion 296 of housing 22 thereby axially shifting all the rings of the spring retainer assembly 288 and the compressed Belleville springs 286 into an adjusted position along the length of the mounting member 274. When the pressure in cavity 50 is relieved, the Belleville springs 286 will act against the housing to 22 to return the piston 46 to its released position and the adjusted position of the spring retainer assembly along the length of the respective mounting member 274 will return the piston 46 to a released position wherein a fixed distance is provided between the piston 46 and the brake members 28, 30 regardless of the wear on the brake surfaces 34, 36.

In the embodiment illustrated in FIG. 6, the mounting member 274 attaches to the rear side of the piston 46.

Attaching the brake release assembly 272 to the rear side of the piston 50 yields certain advantages. In the embodiment illustrated in FIG. 6, the required spring force offered by the spring mechanism 284 and the area of the brake piston 46 can be significantly reduced to achieve a park brake capacity since the spring mechanism 284 is not opposing the force of the springs 58 when the park brake is applied.

Figure 8:
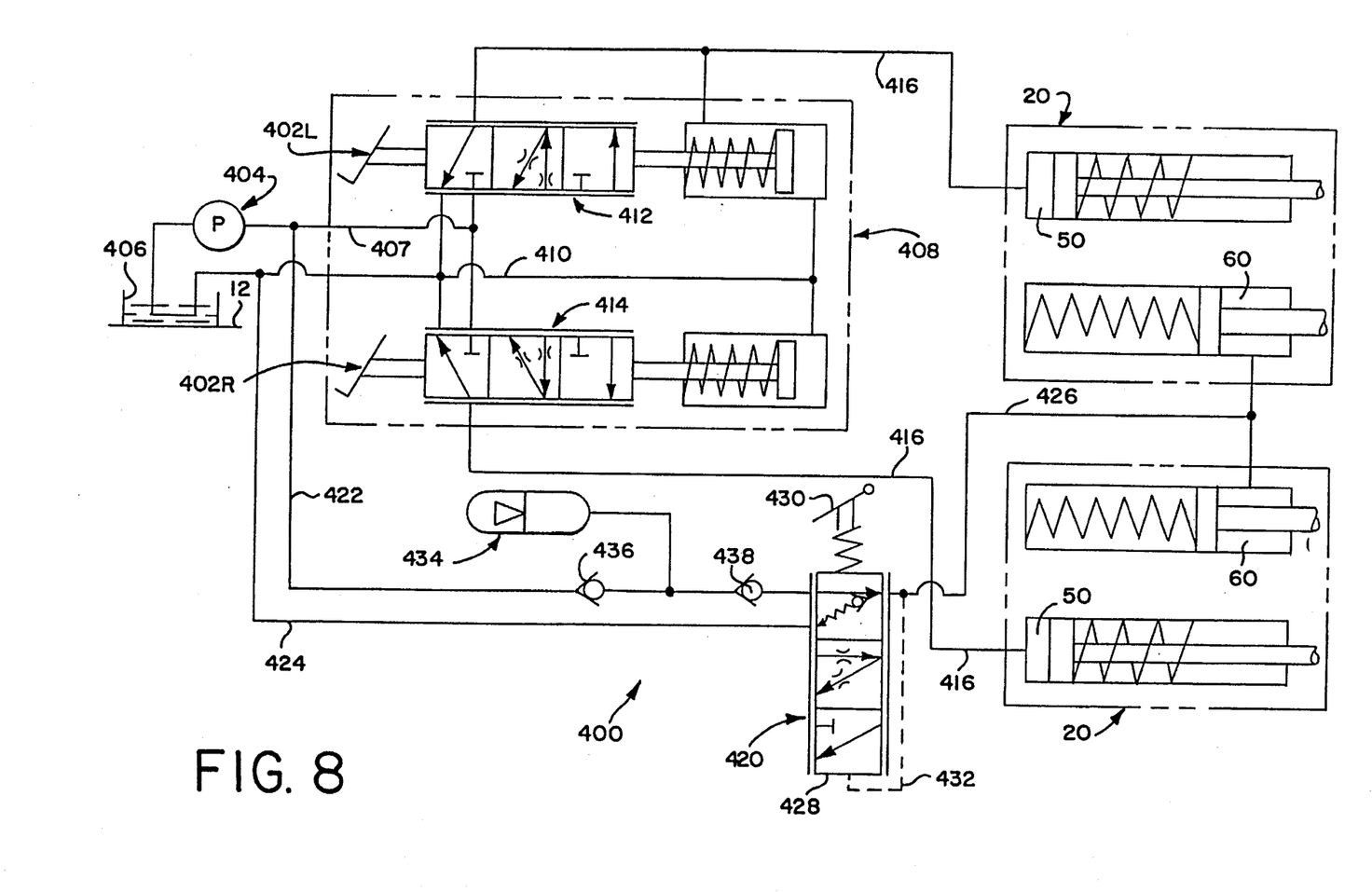
FIG. 8 is a schematic illustration of one form of hydraulic system for operating the brake assembly.

FIG. 8 schematically illustrates one form of a hydraulic system 400 used to actuate each hydraulic brake assembly on the implement. As is conventional, the off-highway implement 10 is provided with operator controlled brake pedals 402L and 402R for manually braking the left and right drive wheels, respectively, of the implement 10. As is well known, the brake pedals 402L and 402R can be operated individually, to promote turning of the implement, or in combination with each other.

The hydraulic system 400 preferably includes a fixed displacement pump assembly 404 that is capable of providing about 300 p.s.i. to the hydraulic system for operating each hydraulic brake assembly 20. The intake side of pump assembly 404 is connected to a hydraulic reservoir 406 mounted on the frame 12 of the implement 10. The output of the pump assembly 404 is connected via inlet conduit 407 to a hydraulic valve assembly 408. An exhaust line or conduit 410 leads from valve assembly 408 to the reservoir 406.

Valve assembly 408 is preferably of the type sold by Eaton Corporation under Model No. 39011-EAE. Suffice it to say, valve assembly 408 includes a pair of service brake valves 412 and 414. Service brake valve 412 is responsive to manual operation of brake pedal 402L while service brake valve 414 is responsive to operation of brake pedal 402R. Each valve 412 and 414 is preferably configured as a three position valve including an intermediary metering position that serves to modulate the fluid pressure being applied to each brake assembly 20. A suitable line or conduit 416 connects each valve 412, 414 to cavity 50 of each hydraulic brake assembly. As will be appreciated, the position of each valve 412 and 414 controls the fluid flow to the cavity 50 of each brake assembly 20 thereby influencing the service brake function of the implement 10. That is, when the service brake is to be applied, the operator operates either and/or both brake pedals 402L, 402R to shift the respective valves 412, 414 to the left, as shown in FIG. 8, thereby allowing pressurized fluid into the brake cavity 50 with sufficient pressure to overcome the effectiveness of the spring release mechanism serving to hold the service brake in a released position. Accordingly, the service brake will be applied. As will be appreciated, when the operator releases the pedals 402L, 402R, the valves 412, 414 will return to the right, as shown in FIG. 8, thereby connecting each chamber 50 to exhaust whereby allowing the spring release mechanism to return the service brake to a released position.

Another valve structure 420 is provided in the hydraulic system 400 for operating each brake assembly 20 in a park brake or emergency brake mode. An inlet line or conduit 422 connects valve structure 420 to the outlet of pump assembly 404. An exhaust line or conduit 424 leads from valve structure 420 to the reservoir 406. A suitable conduit or line 426 leads from the output of valve structure 420 to the park brake cavity 60 of each hydraulic brake assembly 20.

The valve structure 420 preferably includes a linearly shiftable three position valve 428 that normally provides pressurized fluid to the park brake cavity 60 of each hydraulic brake assembly 20. Valve 428 is positioned preferably under the influence of a manually actuated park brake lever 430 located in the cab region of the implement. Notably, valve 428 preferably includes an intermediary position that serves to meter the flow of hydraulic fluid to the park brake cavity 60 of each brake assembly 20 and allows valve structure 420 to vent to the reservoir or tank 406 such that the pressure acting on piston 48 is inhibited from exceeding 300 p.s.i. A pilot line 432 extends from line 426 and serves to influence the position of the valve 428. As will be appreciated, the position of valve 428 controls the fluid flow to the brake cavity 60 of each hydraulic brake assembly 20. That is when the park brake or emergency brake is to be applied, the operator operates the brake lever 430 to shift the valve 420 upwardly, as shown in FIG. 8, allowing fluid to be exhausted from and, thus, reducing the pressure in each brake cavity 60 thereby allowing the springs 58 to move the diametrical extension 62 on the brake piston 48 into engagement with the brake piston 48 to impart a compressive force to the friction members 28, 30 and thereby imparting a braking action to the shaft 18. When the operator returns the brake lever 430 to its released position, the valve 420 will be lowered, as shown in FIG. 8, thereby connecting each chamber 60 to the outlet of the pressurized source of fluid 404 thereby allowing pressurized fluid into each brake cavity 60 with sufficient pressure to overcome the effectiveness of the springs 58 urging the brake into an applied position thus effectively releasing the park or emergency brake.

To accommodate European requirements, the hydraulic system 400 may further include an accumulator 434. The accumulator 434 is a conventional structure that is connected to the inlet conduit 422 leading to the valve structure 420. Suitable check valves 436 and 438 are conventionally arranged in combination with the accumulator 434. Accordingly, should the hydraulic system or the service brake function of the hydraulic brake system fail, the accumulator 434 can provide suitable fluid pressure to effect emergency brake function as by the park brake piston 48 applying a braking action to the output shaft 18 of the transmission.

In case the brake members 28, 30 wear out due to unusual usage of the brake assembly, a provision is made to have the service brake system fail first and still have emergency braking capability. This is accomplished by providing the passages 98 in the service brake piston bore 50. The passages 98 in the service brake piston bore 50 interrupt sealing action of the inner seal 54 when the piston 46 travels beyond a certain distance to engage the brake plates 28, 30 causing an initially small leakage that becomes progressively larger as the wear on the disks 28, 30 increases. The provision of the passages 98 causes the service brake piston 46 to become less and less effective, thus providing notice to the operator that the brake members 28, 30 have significant wear thereon. At any time during this deterioration of the service brake, emergency braking can be actuated by applying the park brake 48.

Regardless of the embodiment used, a salient feature of the present invention concerns a self-adjusting return spring arrangement provided in combination with the brake piston 46 for controlling the running clearance between the disks 28, 30 and the piston 46 during a disengaged mode of operation of the brake assembly. Another unique feature of the present invention concerns a brake arrangement that makes use of the mounting surface of the transmission housing as the reaction surface for the brake plates 28, 30. Moreover, the park brake piston 48, service brake piston 46, and friction brakes 28, 30 are arranged such that the brake housing 22 has a continuously increasing diameter which lends itself to a relatively simply casting process in that no pockets are created which would require coring. Furthermore, the housing 22 is configured with reaction slots that cooperate with radial tangs 38 on the stationary friction brake members 30 and are configured to allow the housing casing to be prepared without coring. The wear pins 42 between the tangs 38 of the friction brake members 30 and the housing allow a relatively soft housing material such as aluminum to be used in combination with the brake assembly. As is well known, aluminum has good heat transfer characteristics and can be die cast at relatively low manufacturing costs.

From the foregoing, it will be observed and numerous modifications and variations can be effected without departing from the true spirit and scope of the novel concept of the present invention. It will be appreciated that the present disclosure is intended to set forth exemplifications of the invention but such exemplifications are not intended to limit the invention to the specific embodiments illustrated. The disclosure is intended to cover by the appended claims all such modifications as fall within the spirit and scope of the claims.

What is claimed is:

1. A hydraulically actuated brake assembly for yielding both a service brake function and a park brake function to an off-highway implement, comprising:

a shaft mounted for rotation about a fixed axis in a stationary housing;

a plurality of annular brake members arranged in an intermixed and stacked relationship relative to each other, with some of said brake members rotating with said shaft and others of said brake members being held stationary relative to said housing, each friction brake member having wetted friction brake surfaces on opposite sides thereof;

an annular service brake piston coaxially arranged about and axially displacable along the axis defined by said shaft, a portion of said service brake piston combining with said housing to define a first fluid receiving cavity, with said service brake piston being movable between a released position, wherein a fixed clearance is provided between said service brake piston and said brake members, and an engaged position, wherein said service brake piston is operative to apply a force against said brake members to effect a braking action on said shaft, said service brake piston being moved from a released position to an engaged position under the influence of pressurized fluid being selectively directed to said first fluid receiving cavity;

an annular park brake piston coaxially arranged about and for axial displacement along the axis defined by said shaft, a portion of said park brake piston combining with said housing to define a second fluid receiving cavity, with said park brake piston being resiliently biased toward said service brake piston to apply a force against said service brake piston and thereby effect a braking action on said shaft and is movable away from said service brake piston, under the influence of pressurized fluid selectively directed to said second fluid receiving cavity, to operatively prevent said service brake piston from applying a braking action to said brake members under the influence of said park brake piston; and a series of equally spaced self-compensating brake release assemblies for urging said service brake piston to a released position wherein said fixed clearance is provided between said service brake piston and said brake members, each self-compensating brake release assembly comprising an axially elongated mounting member connected to and extending from at least one of said service brake and said park brake pistons generally parallel to said axis, a spring mechanism arranged coaxially about and extending radially from said mounting member for urging said service brake piston toward its released position, and a spring retainer assembly for captively maintaining said spring mechanism between opposite ends thereof and in operative association with said mounting member while permitting compression of said spring mechanism in response to axial movement of said service brake piston from a released position, and wherein said spring retainer assembly is axially movable along the length of a respective mounting member to compensate for wear between the friction brake surfaces on said brake members while maintaining said fixed clearance between the service brake piston and the brake members after said service brake piston is returned to its released position to optimize brake drag between the brake members while maintaining a substantially constant brake actuation response.

2. The brake assembly according to claim 1 wherein the spring retainer assembly of each brake release assembly comprises at least one annular ring clamped to a respective mounting member on opposite sides of the spring mechanism with a pressure that prevents each ring from axially moving relative to the respective mounting member in response to compression of the spring mechanism while allowing the rings to axially move corresponding axial distances along the length of the respective mounting member in response to an increase in axial travel of the service brake piston to compensate for wear on the brake surfaces of the friction brake members.

3. The brake assembly according to claim 2 wherein the spring mechanism of each release assembly includes a series of axially aligned belleville springs, and wherein a first portion of said service brake piston engages an outer edge portion of at least one belleville spring to effect compression of the spring mechanism while a second portion of the service brake piston engages the ring disposed between the belleville springs and the service brake piston when the spring mechanism has been completely compressed to axially move the snap rings along the length of the respective mounting member thereby maintaining the fixed cleaner between the service brake piston and the brake members after the service brake piston is returned to its released position.

4. The brake assembly according to claim 1 wherein said service brake piston has a larger outside diameter than does the park brake piston such that the housing has an internal stepped configuration for accommodating the pistons for axial sliding movements.

5. The brake assembly according to claim 1 wherein said housing is provided with internal reaction slots that coact with tangs that radially extends from those brake members that are held stationary relative to said housing.

6. The brake assembly according to claim 1 wherein said service piston is provided with inner and outer annular seals that are arranged in fluid tight sliding relation relative to the first fluid receiving cavity, and wherein said housing defines a series of passages arranged in association with the first fluid receiving cavity for interrupting the sealing action of the inner seal and the housing after the service piston travels beyond a predetermined distance thereby causing a deterioration in the service brake function while maintaining the park brake function.

7. A hydraulically actuated brake assembly for an off-highway implement, comprising:

a shaft mounted for rotation about a fixed axis in a stationary housing;

an actuator assembly and a series of annular and intermixed friction brake members operative to effect a braking action on said shaft in response to said actuator assembly applying a force thereto, with some of said brake members rotating with the shaft while others remain stationary relative to said housing, each annular brake member having wetted brake surfaces on opposite sides thereof, said actuator assembly including a first annular brake piston that combines with said housing to define a first fluid receiving cavity, said first piston being movable through a path of travel along the axis of said shaft between a released position, wherein a fixed clearance is provided between said first piston and the brake members thereby relieving the brake force on said shaft, and an engaged position, wherein said first piston applies a force against said brake members to impart a braking action to said shaft, and a resiliently biased second annular brake piston that combines with said housing to define a second fluid receiving cavity and which is mounted in axial alignment with and for axial movement toward said first piston for yieldingly moving said first piston to apply a force against said brake members when the fluid pressure in said second cavity is at a lower pressure and for moving away from said first piston when the fluid pressure in said second cavity is adequately increased to relieve the braking force applied to the brake members and thereby the shaft; and a series of self-compensating brake release assemblies peripherally disposed about said actuator assembly for urging said first piston into a released position wherein said fixed clearance is provided between said first piston and the brake members, each brake release assembly comprising a mounting member that extends axially from one of the pistons of said actuator assembly, a spring mechanism arranged coaxially about and radially from said mounting member for yieldingly moving said first piston toward its released position, and a spring retainer assembly for captively maintaining the spring mechanism between opposite ends thereof and in operative association with a respective mounting member while permitting compression of said spring mechanism in response to axial movement of said fast piston toward an engaged position, and wherein the spring retainer assembly is axially movable along the length of the mounting member to compensate for wear of the friction brake surfaces on the brake members while maintaining said fixed clearance between the fast piston and the brake members following the return of said first piston to its released position.

8. The brake assembly according to claim 7 wherein said stationary housing includes a series of reaction slots on an interior thereof, and wherein each stationary brake member includes a series of peripheral tangs that engage with the reaction slots on the housing to hold the members stationary relative to the housing.

9. The broke assembly according to claim 8 further including wear pins fitted between the tangs on the stationary brake members and the housing to reduce the wear on the reaction slots defined by the housing.

10. The brake assembly according to claim 7 wherein the spring retainer assembly of each brake release assembly comprises at least one snap ring clamped to a respective mounting member on opposite sides of the spring mechanism with a pressure that prevents each ring from axially moving relative to the respective mounting member in response to compression of the spring mechanism while allowing the rings to axially move corresponding axial distances along the length of the respective mounting member in response to an increase in axial travel of the service brake piston to compensate for wear on the brake surfaces of the friction brake members.

11. The brake assembly according to claim 10 wherein the spring mechanism of each brake release assembly includes a stack of belleville springs, and wherein a first portion of the first piston engages an outer edge portion of the belleville spring disposed axially closest to said first piston to effect compression of the spring stack upon movement of the first piston from said released position while a second portion of the first piston engages a snap ring disposed between the first piston and the spring stack after the spring stack has been completely compressed to axially move the rings of the spring retainer assembly corresponding axial distances along the length of the respective mounting member thereby maintaining the fixed clearance between the first piston and the brake members after the first piston is returned to its released position.

12. The brake assembly according to claim 7 wherein the brake release assemblies are not effected by axial movement of the second brake piston, and wherein each spring retainer assembly includes a cartridge slidable along the length of the mounting member in response to axial displacement of the first piston, said cartridge engaging said spring mechanism at one end thereof and is provided with a sleeve captively arranged within said cartridge at an opposite end, said sleeve being slidable along the length of the mounting member and relative to said cartridge and defines a first end captively maintained within said cartridge and that engages an opposite end of said spring mechanism and a second end that extends axially beyond said cartridge and engages a snap ring that is clamped to the mounting member, and wherein the snap ring is engagable by the cartridge and moved along the length of mounting member under the influence of the first piston to adjust for wear on the brake surfaces of the fiction brake members thereby maintaining the same travel for the first piston between engaged and released positions.

13. A hydraulically actuated brake assembly for an off-highway implement, comprising:

a shaft mounted for rotation about a fixed axis in a stationary housing;

an actuator assembly and a plurality of annular and intermixed friction brake members operative to effect a braking action on said shaft in response to said actuator assembly applying a force to said brake members, with alternate friction brake members being adapted to rotate with the shaft while other friction brake members remain stationary relative to said housing, each annular brake ring having wetted brake surfaces on opposite sides thereof, said actuator assembly including a first annular brake piston that combines with said housing to define a first fluid receiving cavity and that is mounted in said housing for axial movement along a path of travel toward and away from said brake members, springs operatively associated with and for moving said first piston away from a released position and into an engaged position whereat said first piston is operatively associated with and forces said brake members to apply a braking action to said shaft as long as the fluid pressure in said first fluid receiving cavity is less than the pressure applied to the fast piston by said springs, and wherein said first piston is retained in said released position as long as the fluid pressure in said first fluid receiving cavity is greater than the pressure exerted by said springs against said first piston, a second annular brake piston that combines with said housing to define a second fluid receiving cavity, said second piston being coaxially mounted in said housing about said axis and for movement along a path of travel between a released position, wherein a fixed clearance is provided between said second piston and said brake members thereby relieving the braking force applied to said shaft, and an engaged position, wherein said second piston applies a force against said brake members to impart a braking action to said shaft, said second piston being operatively disposed between said first piston and said brake members for effecting a braking action on said shaft either through said first piston being moved into its engaged position or through selective pressurization of said second fluid receiving cavity whereby effecting movement of the second piston toward said brake members independent of the action of said first piston; and a series of self-compensating brake release assemblies peripherally disposed about said actuator assembly for urging said second piston into its released position wherein said fixed clearance is provided between said second piston and the brake members, each release assembly comprising a mounting member that extends axially from one of the pistons of said actuator assembly, a spring mechanism arranged coaxially about and radially from said mounting member for yieldingly moving said second piston toward its released position, and a spring retainer assembly for captively maintaining the spring mechanism between opposite ends thereof and in operative association with the mounting member while permitting compression of said spring mechanism in response to axial movement of said second piston toward an engaged position, and wherein the spring retainer assembly axially moves along the length of the mounting member to compensate for wear of the friction brake surfaces on the brake members while maintaining said fixed clearance between the second piston and the brake members following the return of said second piston to its released position.

14. The brake assembly according to claim 13 wherein the spring retainer assembly of each brake release mechanism comprises at least one annular ring clamped to a respective mounting member on opposite sides of the spring mechanism with a pressure that prevents each ring from axially moving relative to the respective mounting member in response to compression of the spring mechanism while allowing the rings to axially move corresponding axial distances along the length of the respective mounting member in response to an increase in axial travel of the second brake piston to compensate for wear on the brake surfaces of the friction brake members.

15. The brake assembly according to claim 14 wherein the spring mechanism of each release assembly includes a series of axially aligned belleville springs, and wherein a first portion of said second brake piston engages a portion of at least one belleville spring to effect compression of the spring mechanism while a second portion of the second brake piston engages the ring of the spring retainer assembly disposed between the belleville springs and the second brake piston when the spring mechanism has been completely compressed to axially move the rings of the spring retainer assembly along the length of the respective mounting member thereby maintaining the fixed clearance between the second brake piston and the brake members after the second brake piston is returned to its released position.

16. The brake assembly according to claim 14 wherein each brake release assembly is connected and responsive to movement of the second piston, and the spring mechanism of each release assembly comprises a set of axially aligned belleville springs, and wherein a first portion of said housing engages a portion of at least one belleville spring in said set to effect compression of the spring mechanism while a second portion of the housing engages the annular ring disposed between the belleville springs and the second piston when the spring mechanism has been completely compressed to axially move both annular rings corresponding axial distances along the length of the respective mounting member thereby maintaining the fixed clearance between the second piston and the brake members after the second piston is returned to its released position.

17. The brake assembly according to claim 13 wherein the brake release assemblies are not effected by axial movement of the first brake piston, and wherein each spring retainer assembly includes a cartridge slidable along the length of the mounting member in response to axial displacement of the second piston, said cartridge engaging said spring mechanism at one end thereof and is provided with a sleeve captively arranged within said cartridge at an opposite end, said sleeve being slidable along the length of the mounting member and relative to said cartridge and defines a first end captively maintained within said cartridge and that engages an opposite end of said spring mechanism and a second end that extends axially beyond said cartridge and engages a snap ring that is clamped to the mounting member, and wherein the snap ring is engagable by the cartridge and moved along the length of mounting member under the influence of the second piston to adjust for wear on the brake surfaces of the friction brake members thereby maintaining the same travel for the second piston between engaged and released positions.

18. A hydraulically actuated brake assembly for an off-highway implement including a transmission having a housing, comprising:

a transmission output shaft mounted for turning movement about a fixed axis in a stationary housing affixed to the transmission housing;

an actuator assembly and a pack of annular and intermixed friction plates operative to effect a braking action to said transmission output shaft in response to said actuator assembly applying a force to said brake members, with some of friction plates being adapted to rotate with the shaft while others remain stationary relative to said housing, each annular friction plate having wetted brake surfaces on opposite sides thereof, and wherein a surface on the transmission housing serves as a reaction surface for the annular friction plates, said actuator assembly including a first annular brake piston that combines with said stationary housing to define a first fluid receiving cavity, said first piston being movable along the axis of said shaft between a released position, wherein a fixed clearance is provided between said first piston and the brake members thereby relieving the brake force on said shaft, and an engaged position, wherein said first piston applies a force against said brake members to impart a braking action to said shaft, and a resiliently biased second annular brake piston that combines with said stationary housing to define a second fluid receiving cavity and which is mounted in axial alignment with and for axial movement toward said first piston for yieldingly moving said first piston to apply a force against said brake members when the fluid pressure in said second cavity is at a lower pressure and for moving away from said first piston when the fluid pressure in said second cavity is adequately increased to relieve the braking force applied to the brake members and thereby the shaft; and a series of self-compensating brake release assemblies peripherally disposed about said actuator assembly for urging said first piston into a released position wherein said fixed clearance is provided between said first piston and the brake members, each brake release assembly comprising a mounting member that extends axially from one of the pistons of said actuator assembly, a spring mechanism arranged coaxially about and radially from said mounting member for yieldingly moving said first piston toward its released position, and a spring retainer assembly for captively maintaining the spring mechanism between opposite ends thereof and in operable association with the mounting member while permitting compression of said spring mechanism in response to axial movement of said first piston toward an engaged position, and wherein the spring retainer assembly axially moves along the length of the mounting member to compensate for wear of the friction brake surfaces on the brake members while maintaining said fixed clearance between the first piston and the brake members following the return of said first piston to its released position.

19. The brake assembly according to claim 18 wherein the spring retainer assembly of each brake release assembly comprises at least one annular ring clamped to a respective mounting member on opposite sides of the spring mechanism with a pressure that prevents each ring from axially moving relative to the respective mounting member in response to compression of the spring mechanism while allowing the rings to axially move corresponding axial distances along the length of the respective mounting member in response to an increase in axial travel of the first brake piston to compensate for wear on the brake surfaces of the friction brake members.

20. The brake assembly according to claim 19 wherein the spring mechanism of each brake release assembly includes a series of axially aligned belleville springs, and wherein a first portion of said first brake piston engages a portion of at least one belleville spring to effect compression of the spring mechanism while a second portion of the first brake piston engages the spring retainer disposed between the belleville springs and the service brake piston when the spring mechanism has been completely compressed to axially move the spring retainers along the length of the respective mounting member thereby maintaining the fixed clearance between the first brake piston and the brake members after the first brake piston is returned to its released position.

21. The brake assembly according to claim 19 wherein each brake release assembly is connected and responsive to movement of the first brake piston, and the spring mechanism of each release assembly comprises a set of axially aligned belleville springs, and wherein a first portion of said housing engages a portion of at least one belleville spring in said set to effect compression of the spring mechanism while a second portion of the housing engages the annular ring disposed between the belleville springs and the fast brake piston when the spring mechanism has been completely compressed to axially move both annular rings corresponding axial distances along the length of the respective mounting member thereby maintaining the fixed clearance between the first brake piston and the brake members after the first brake piston is returned to its released position.

22. The brake assembly according to claim 18 wherein the brake release assemblies are not effected by axial movement of the second brake piston, and wherein each spring retainer assembly includes a cartridge slidable along the length of the mounting member in response to axial displacement of the first piston, said cartridge engaging said spring mechanism at one end thereof and is provided with a sleeve captively arranged within said cartridge at an opposite end, said sleeve being slidable along the length of the mounting member and relative to said cartridge and defines a first end captively maintained within said cartridge and that engages an opposite end of said spring mechanism and a second end that extends axially beyond said cartridge and engages a snap ring that is clamped to the mounting member, and wherein the snap ring is engagable by the cartridge and moved along the length of mounting member under the influence of the first piston to adjust for wear on the brake surfaces of the friction brake members thereby maintaining the same travel for the first piston between engaged and released positions.

23. A hydraulically actuated brake assembly for yielding both a service brake function and a park brake function to an off-highway implement having a transmission including a housing, comprising:

a stationary housing mounted in an aligned and surrounding relationship relative to an output shaft of the transmission;

an actuator assembly and a pack of annular friction brake members coaxially arranged about the shaft and operative to effect a braking action on said transmission shaft in response to said actuator assembly applying a force to said brake members, said friction brake members being arranged in an intermixed and stacked relationship relative to each other with alternating friction brake members rotating with the transmission shaft while others remain stationary relative to said housing, each annular brake member having wetted brake surfaces on opposite sides thereof, and wherein the transmission housing serves as a reaction surface for the annular brake members, said actuator assembly including an annular park brake piston that combines with said stationary housing to define a first fluid receiving cavity and that is mounted in said stationary housing for axial movement along said shaft toward and away from said brake members, a series of springs operatively associated with and for moving said park brake piston away from a released position thereby relieving the braking force applied to said transmission shaft and into an engaged position whereat said park brake piston is operatively associated with and forces said brake members to apply a braking action to said transmission shaft as long as the fluid pressure in said first fluid receiving cavity is less than the pressure applied to the park brake piston by said springs, and wherein said park brake piston is retained in said released position as long as the fluid pressure in said fist fluid receiving cavity is greater than the pressure exerted by said springs against said park brake piston, an annular service brake piston that combines with said stationary housing to define a second fluid receiving cavity, said service brake piston being coaxially mounted in said stationary housing about and for movement along said shaft between a released position wherein a fixed clearance is provided between said service brake piston and said brake members thereby relieving the braking force applied to said transmission shaft and an engaged position wherein said service brake piston applies a force against said brake members to impart a braking action to said transmission shaft, said service brake piston being operatively disposed between said park brake piston and said brake members for effecting a braking action on said transmission shaft either through said park brake piston being moved from its released position or through selective pressurization of said second fluid receiving cavity whereby effecting movement of the service brake piston toward said brake members independent of the action of said park brake piston; and a series of self-compensating brake release assemblies peripherally disposed about said actuator assembly for normally urging said service brake piston into its released position wherein said fixed clearance is provided between said service brake piston and the brake members, each release assembly comprising a mounting member that extends axially from one of the pistons of said actuator assembly, a spring mechanism arranged coaxially about and radially from said mounting member for yieldingly moving said service brake piston toward its released position, and a spring retainer assembly for captively maintaining the spring mechanism between opposite ends thereof and in operative association with a respective mounting member while permitting compression of said spring mechanism in response to axial movement of said service brake piston toward an engaged position, and wherein the spring retainer assembly axially shifts along the length of the mounting member under the influence of said service piston to compensate for wear of the friction broke surfaces on the brake members while maintaining said fixed clearance between the service brake piston and the brake members following the return of said service brake piston to its released position.

24. The brake assembly according to claim 23 wherein said service piston is provided with inner and outer annular seals that are arranged in fluid tight sliding relation relative to the first fluid receiving cavity, and wherein said housing defines a series of passages arranged in association with the first fluid receiving cavity for interrupting the sealing action of the inner seal and the housing after the service piston travels beyond a predetermined distance thereby causing a deterioration in the service brake function while maintaining the park brake function.

25. A hydraulically actuated brake assembly for an off-highway implement, comprising:

a stationary housing that surrounds a turning shaft to which a braking action is to be applied by the brake assembly;

an actuator assembly and a pack of intermixed brake plates, with some of said brake plates being adapted to turn with the shaft while others remain in nonrotatable association with the housing, each brake plate having wetted friction brake surfaces on opposite sides thereof, said actuator assembly including an annular brake piston that combines with said housing to define a fluid receiving cavity, said piston being movable along an axis of the shaft between a released position, wherein a fixed clearance is provided between the piston and the brake plates thereby relieving the braking force on said shaft, and an engaged position, wherein said piston applies a force against the brake plates to impart a braking action to the brake plates and thereby to the shaft; and a brake release mechanism including a plurality of self-compensating brake release assemblies peripherally disposed about said actuator assembly for urging said brake piston toward its released position, each brake release assembly comprising a mounting member that extends generally parallel to the shaft, a spring mechanism arranged coaxially about and radially from said mounting member for yieldingly moving said brake piston toward its released position, and a spring retainer assembly for captively entrapping the spring mechanism between first and second axially spaced surfaces disposed at opposite ends of said spring mechanism, with said spring retainer assembly being arranged in operable association with the mounting member while permitting compression of said spring mechanism in response to axial movement of said brake piston toward an engaged position, and wherein the spring retainer assembly including said first and second surfaces being axially movable along the length of said mounting member to compensate for wear of the friction brake surfaces on the brake members while maintaining the fixed clearance between the brake piston and the brake members following the return of the brake piston to its released position.

* * * * *